(12) United States Patent
Christ et al.

(10) Patent No.: US 9,776,496 B2
(45) Date of Patent: Oct. 3, 2017

(54) WORK MACHINE, IN PARTICULAR DUMP TRUCK OR TRUCK, HAVING AN ELECTRIC DRIVE

(71) Applicant: Liebherr-Components Biberach GmbH, Biberach an der Riss (DE)

(72) Inventors: Clemens Christ, Biberach an der Riss (DE); Klaus Graner, Biberach an der Riss (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 0 days.

(21) Appl. No.: 15/024,756

(22) PCT Filed: Sep. 24, 2014

(86) PCT No.: PCT/EP2014/002593
§ 371 (c)(1),
(2) Date: May 17, 2016

(87) PCT Pub. No.: WO2015/043743
PCT Pub. Date: Apr. 2, 2015

(65) Prior Publication Data
US 2016/0263983 A1    Sep. 15, 2016

(30) Foreign Application Priority Data

Sep. 25, 2013 (DE) .......... 10 2013 015 986
Nov. 28, 2013 (DE) .......... 10 2013 018 067

(51) Int. Cl.
*B60K 6/00* (2006.01)
*B60W 30/18* (2012.01)
(Continued)

(52) U.S. Cl.
CPC .......... *B60K 6/00* (2013.01); *B60K 6/12* (2013.01); *B60K 6/46* (2013.01); *B60P 1/16* (2013.01);
(Continued)

(58) Field of Classification Search
CPC ........ B60K 6/20; B60K 6/0858; B60K 6/485; B60K 6/12; B60K 6/00; B60K 6/46
See application file for complete search history.

(56) References Cited

U.S. PATENT DOCUMENTS 3,552,261 A * 1/1971 Hunkeler .......... B23F 9/10
409/29
7,950,481 B2 5/2011 Betz et al.
(Continued)

FOREIGN PATENT DOCUMENTS

DE 102006019535 A1 10/2007
DE 102008034242 A1 1/2010
(Continued)

OTHER PUBLICATIONS

ISA European Patent Office, International Search Report Issued in PCT Application No. PCT/EP2014/002593, Jan. 7, 2015, WIPO, 6 pages.

*Primary Examiner* — Hau Phan
(74) *Attorney, Agent, or Firm* — McCoy Russell LLP

(57) ABSTRACT

The present invention relates to a work machine, in particular in the form of a dump truck or truck, comprising a traction drive unit and/or main work unit which can be driven by a drive apparatus comprising at least one electric motor. The invention further relates to a method for operating such a work machine, in accordance with the invention, the drive apparatus comprises at least one hydraulic motor supporting the electric motor, the hydraulic motor
(Continued)

being switched in for starting the drive apparatus and being decoupled on an exceeding of a predefined speed.

13 Claims, 3 Drawing Sheets

(51) Int. Cl.

| | |
|---|---|
| *E02F 9/20* | (2006.01) |
| *B60W 20/00* | (2016.01) |
| *B60W 20/10* | (2016.01) |
| *B60K 6/12* | (2006.01) |
| *B60K 6/46* | (2007.10) |
| *B60P 1/16* | (2006.01) |
| *B66C 23/36* | (2006.01) |

(52) U.S. Cl.
CPC ............ *B60W 20/00* (2013.01); *B60W 20/10* (2013.01); *B60W 30/18027* (2013.01); *B66C 23/36* (2013.01); *E02F 9/2075* (2013.01); *B60W 2300/12* (2013.01); *B60W 2300/16* (2013.01); *B60W 2520/10* (2013.01); *B60W 2710/021* (2013.01); *B60W 2710/105* (2013.01); *B60Y 2200/142* (2013.01); *B60Y 2200/416* (2013.01)

(56) References Cited

U.S. PATENT DOCUMENTS

| | | | |
|---|---|---|---|
| 8,418,797 B2* | 4/2013 | Matsumoto | F16H 61/435 180/197 |
| 8,826,653 B2* | 9/2014 | Komiyama | E02F 9/128 60/403 |
| 8,947,026 B2 | 2/2015 | Graner et al. | |
| 8,978,798 B2* | 3/2015 | Dalum | B60K 6/12 180/65.22 |
| 9,004,217 B2* | 4/2015 | Okumura | E02F 9/08 180/291 |
| 9,061,680 B2* | 6/2015 | Dalum | B60W 20/10 |
| 9,103,094 B2* | 8/2015 | Magaki | B60K 6/485 |
| 9,107,286 B2* | 8/2015 | Tsuchiya | E02F 9/0858 |
| 9,108,498 B2* | 8/2015 | Schultz | B60K 6/12 |
| 9,109,586 B2* | 8/2015 | Yamada | B60K 6/20 |

FOREIGN PATENT DOCUMENTS

| | | |
|---|---|---|
| DE | 102010014644 A1 | 10/2011 |
| EP | 1770852 A1 | 4/2007 |
| JP | 2011098680 A | 5/2011 |
| WO | 2008072044 A2 | 6/2008 |

* cited by examiner

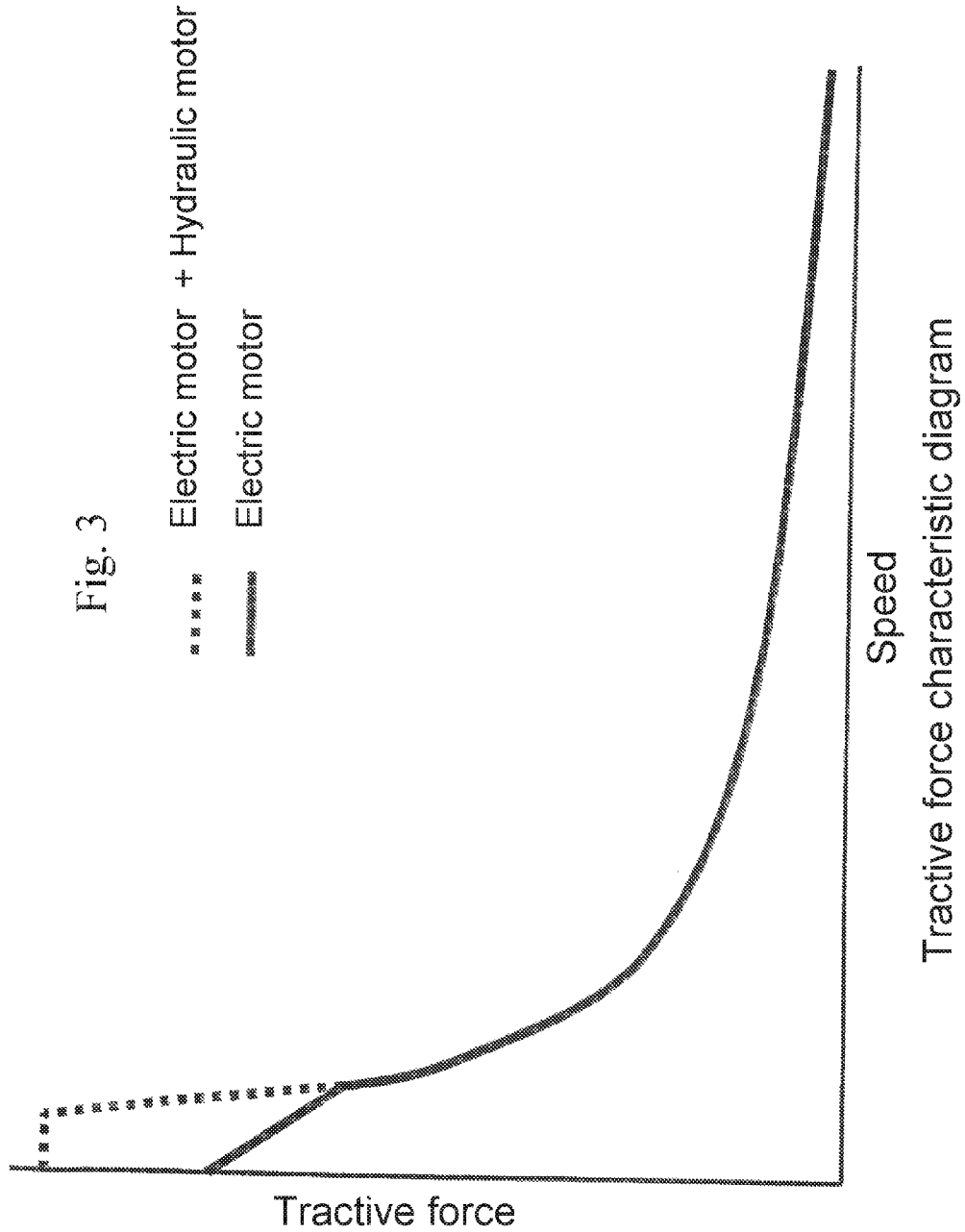

WORK MACHINE, IN PARTICULAR DUMP TRUCK OR TRUCK, HAVING AN ELECTRIC DRIVE

CROSS REFERENCE TO RELATED APPLICATIONS

The present application is a U.S. National Phase of International Patent Application Serial No. PCT/EP2014/002593, entitled "Working Machine, in Particular a Dumper Truck or Truck, Having an Electric Drive," filed on Sep. 24, 2014, which claims priority to German Patent Application No. 10 2013 018 067.8, filed on Nov. 28, 2013, and to German Patent Application No. 10 2013 015 986.5, filed Sep. 25, 2013, the entire contents of each of which are hereby incorporated by reference in their entirety for all purposes.

TECHNICAL FIELD

The present invention relates to a work machine, in particular in the form of a dump truck or truck, comprising a traction drive unit and/or main work unit which can be driven by a drive apparatus comprising at least one electric motor. The invention further relates to a method for operating such a work machine.

BACKGROUND AND SUMMARY

With different work machines such as self-propelled work machines in the form of dump trucks, trucks, bulldozers or similar construction vehicles or mining vehicles or surface cutters such as surface miners, asphalt cutters or snow blowers, electric motors have increasingly been used in recent times for the traction drive and/or for the main work unit since such electric drives have considerable advantages over hydrostatic drives, in particular a better efficiency and an easier servicing, for instance. The higher purchasing costs of electric motors can be compensated again very fast due to the considerably better efficiency and the hereby lower operating costs.

The size of the electric motor is in this respect determined to a large extent by the starting torque or by the maximum required drive torque so that the starting torque has a great influence on the costs of the electric machine. For example, a dump truck or truck for starting up on heavy ground or on inclines requires a relative high starting torque which is considerably larger than the torque required in normal drive operation. Bulldozers, for example, require an increased drive torque when an immobile rock or a frozen dump of earth has to be pushed away. With work machines such as the named surface miners or asphalt cutters, a relatively high start-up torque can likewise be required, for example in order to release a milling drum with a jerk after it has frozen.

Although these starting or start-up situations only make up a small part of the total operating time of the respective work machine, the drive apparatus must nevertheless be designed for this in order to satisfy the operating requirements.

It has already been proposed in this respect, cf. DE 10 2010 014 644 A1 to operate the electric motor for the start-up process of the milling drum of a surface miner with a frequency inverter to limit the starting current on the ramping up and to bridge the frequency inverter after the ramp-up procedure to reduce the losses arising in the frequency inverter and the reduction of the efficiency of the electric motors in started-up operation which accompanies the operation at the frequency inverter. Such a bridging of the frequency inverter is, however, difficult when larger speed variations arise in the intended operation such as is the case in the traction drive of a truck or dump truck, for example.

U.S. Pat. No. 7,950,481 proposes a bulldozer with an electric drive whose drive torque can be briefly increased by switching in a battery, i.e. an increased power supply; however, this in turn requires a sufficiently large electric motor.

It is the underlying object of the present invention to provide an improved work machine of the initially named kind as well as an improved method for operating such a work machine to avoid the disadvantages of the prior art and to further develop the latter in an advantageous manner. In particular, the drive torque which is required for starting, which may be very high, should be able to be provided by the drive without this having to be paid for by efficiency losses in the normal operation range and by over-dimensioned, expensive electric motors.

This object is achieved in accordance with the invention by a work machine having a traction drive unit and/or a main work unit which is driven via a drive apparatus comprising at least one electric motor, wherein the drive apparatus has at least one hydraulic motor supporting the electric motor; and by a method for operating a work machine having a drive apparatus having at least one electric motor and at least one hydraulic motor for driving a traction drive unit and/or work unit, wherein the hydraulic motor is switched in for starting the traction drive unit and/or work unit and is decoupled on an exceeding of a predefined speed.

It is therefore proposed also to provide a hydraulic drive in addition to the electric drive, the hydraulic drive being able to support the electric motor as required to be able to provide the required, increased torque in special operating situations such as the starting up under unfavorable conditions, in accordance with the invention, the drive apparatus comprises at least one hydraulic motor supporting the electric motor. An additional drive torque can be provided by the hydraulic motor, which allows the electric motor to be dimensioned smaller than would be the case if the total drive torque of the traction drive or of the main work unit had to be applied by the electric motor alone.

In an advantageous further development of the invention, the hydraulic motor can be switched in by means of a clutch and can be separated from the drive train such that the hydraulic motor is only used or only has to be operated when the additional torque of the hydraulic motor is actually required, in particular in operating situations which exceed the starting torque of the electric motor. The hydraulic motor in particular does not have to be coupled in when the drive torque of the electric motor is alone sufficient such that the efficiency of the drive apparatus is considerably improved. On the other hand, the drive apparatus can be operated at higher speeds which the hydraulic motor would as a rule not tolerate, but are provided as intended by the at least one electric motor.

The named clutch by means of which the hydraulic motor can be coupled to and decoupled from the drive train can in this respect be configured as a dog clutch. Such dog clutches work largely free of loss in the opened state so that in normal operation with a decoupled hydraulic motor no losses in or impairments of the efficiency arise due to the clutch. Alternatively to such a dog clutch, however, a multi-plate clutch can also be used by means of which the hydraulic motor can advantageously also be switched in on speed differences between the electric motor and the hydraulic motor.

In a further development of the invention, the at least one electric motor and the hydraulic motor can be connected to a common drive train which conducts the drive torques at the output side from the electric motor and the hydraulic motor into the unit part to be driven. In an advantageous further development of the invention, in this respect the hydraulic motor can be connected to the electric motor in serial connection such that, with a closed clutch, the drive torque of the hydraulic motor is conducted onward via the electric motor to the output-side end of the drive train. The hydraulic motor can in particular be connected to the electric motor by means of the named clutch, with the electric motor being connectable to the hydraulic motor via the clutch, on the one hand, and being connected to the drive train, on the other hand, to drive the element or unit part to be driven.

It would, however, generally also be possible to provide the hydraulic motor and the electric motor in a parallel connection with one another and only to merge the drive torques directly at the unit part to be driven or at a drive train part connected thereto such that the drive torque of the hydraulic motor is not conducted via the electric motor. The aforesaid design with a connection of the hydraulic motor to the electric motor, however, has advantages with respect to a simple design of the drive train and to a compact arrangement.

The hydraulic motor and the electric motor can in particular be arranged coaxially with one another so that their drive axles are oriented substantially in alignment with one another. The electric motor can advantageously comprise two shaft connection stubs at oppositely disposed sides of which one is connected to the element to be driven and the other is connectable to the hydraulic motor, optionally in each case with the interposition of suitable transmission or drive elements such as a clutch, transmission, step-up or step-down stages and the like.

In an advantageous further development of the invention, the named drive train can comprise a transmission to make the achievable drive speeds of the electric motor and/or of the hydraulic motor compatible with the required speed at the drive unit part to be driven or also compatible with one another. In accordance with an advantageous further development of the invention, the named transmission can be provided between the electric motor and the output-end of the drive train. The connection of the hydraulic motor to the electric motor can be configured as transmission-free, with the clutch for coupling and decoupling the hydraulic motor naturally being able to be provided in the aforesaid manner. In this case, the hydraulic motor and the electric motor run at the same speed with a closed clutch.

Alternatively or additionally to the aforesaid design, the drive train can, however, also have a transmission between the hydraulic motor and the electric drive. The additional drive torque of the hydraulic motor can hereby be switched in over a larger speed range of the electric motor so that the additional torque of the hydraulic motor can be provided over a larger speed range.

The switching in of the hydraulic motor can generally take place in various manners, with it being taken into consideration in accordance with a simple design of the invention to control the switching in and optionally also the switching off of the hydraulic motor manually, for example, by actuating an adjustment element by which the aforesaid clutch can be closed and opened. Depending on the starting situation, the machine operator can select whether the hydraulic motor should be switched in, for example such that on a normal start on firm, level ground or with only a limited load of a dump truck or truck, a start is only made using the electric motor and the hydraulic motor remains decoupled, while the machine operator can switch the hydraulic motor in for starting on an incline and/or on deep ground or with a high load.

In a further development of the invention, however, at least one semiautomatic or automatic control of the switching in and/or switching off of the hydraulic motor can advantageously be provided, in particular such that the control apparatus for switching in and/or switching off the hydraulic motor takes account of the speed of the drive apparatus and/or the required drive torque.

For example, in an advantageous further development of the invention, the control apparatus can switch off the hydraulic motor as soon as a predefined speed is reached or exceeded and/or when the required drive torque falls below a predefined value. The named control apparatus can in particular take account of the travel speed with a self-propelled work machine such as a dump truck or truck and can decouple the hydraulic motor automatically when the travel speed exceeds a predefined value. If the hydraulic support of the electric drive is utilized for the driving of a main work unit such as the milling drum of a surface miner, of a snow blower or of an asphalt cutter, the control apparatus can decouple the hydraulic motor when the milling drum has reached a specific speed. Alternatively or additionally, the control apparatus can switch off the hydraulic motor on a falling below of a predefined drive torque which can be monitored, for example, by a suitable sensor system, for example in the form of an ammeter, which measure the current take-up of the electric motor or by another suitable power take-up sensor system which can determine the power take-up of the electric motor. The power take-up can in particular be calculated by means of a used inverter.

In a further development of the invention, the named control apparatus can optionally also control the switching in of the hydraulic motor and for this purpose in turn take account of the speed of the drive apparatus and/or the drive torque required by it, with the hydraulic motor in particular being able to be switched in when the drive speed falls below a predefined speed and/or the required drive torque exceeds a predefined value. The limit values for the drive speed or the required drive torque at which a switching in of the hydraulic motor takes place in this respect do not have to coincide with the previously named limit values for the switching off of the hydraulic motor. For example, the drive speed on whose falling below a switching in of the hydraulic motor takes place can be considerably lower than the travel speed at which the hydraulic motor is switched off. If, for example, a dog clutch is used, the control apparatus can only switch in the hydraulic motor when the drive speed is zero or at least when no greater speed difference is present. If the required drive torque for the switching in is taken into account, the limit value for the switching in can be higher than the limit value for the switching off.

In an advantageous further development of the invention, the named drive apparatus forms the traction drive of a self-propelled work machine, with the drive part to be driven in common by the at least one electric motor and the hydraulic motor which can be switched in being able to be a wheel of the chassis or with a tracked chassis the drive pinion of the tracked chassis. In this respect, the at least one electric motor and the hydraulic motor connectable thereto can drive a single wheel in the sense of a one-wheel drive or can drive the plurality of wheels of a chassis axle in the sense of an axial drive, optionally via an interposed differential. Depending on the configuration, the at least one electric drive and the hydraulic motor which can be switched in can also drive a plurality of axles.

The use of such a drive comprising at least one electric motor and a hydraulic motor which can be switched in can in particular be of advantage for the traction drive of a dump truck or of a truck since here as a rule limited drive torques are required in normal drive operation and thus over a large portion of the operating time and the switching in of the hydraulic motor is only required when starting and thus in smaller operating time portions.

In an advantageous further development of the invention, provision can in this respect be made that the at least one hydraulic motor can be supplied, where required, from the pump or pressure source of the tilting mechanism of the dump body of the dump truck. The tilting mechanism of the dump body is typically only actuated on a standstill of the dump truck, while it is not required in drive operation. The pump or pressure source of the tilting mechanism then not required for the starting of the dump truck can in this respect be used to feed the hydraulic motor of the traction drive. For this purpose, the hydraulic motor can be connected to the pressure circuit of the tilting mechanism via a suitable connection line, preferably while interposing a valve. The pump of the hydraulic tilting mechanism can be driven by the aforesaid internal combustion engine.

Alternatively to such a design of the drive apparatus as a traction drive, the output of the drive apparatus can also be connected to a hoisting drum, for example to the hoisting drum of a crane or of another piece of lifting gear, by means of which a hoist rope or a guying rope of a crane can be adjusted.

In a further development of the invention, the electric motor can be dimensioned too small for the required starting torque or for the maximum drive torque of the work machine and can ideally be designed for the already started work operation or drive operation, in particular for the operating range of the most frequently used speed and/or of the most frequently used torque. The electric motor can in particular have a maximum starting torque and/or a maximum drive torque which is smaller than the maximum starting torque or maximum drive torque required in accordance with its intended purpose for the traction drive unit and/or main drive unit of the work machine, with, on the other hand, the at least one electric motor and the hydraulic motor which can be switched in being configured or dimensioned such that the SUM of the maximum starting torques and/or drive torques of the electric motor and of the hydraulic motor is at least as large as the aforesaid starting torque or drive torque which the traction drive or the main drive unit of the work machine requires. Not only weight can be saved by the under-dimensioning of the electric motor, the costs of the electric motor are also reduced.

The present invention will be explained in more detail in the following with reference to a preferred embodiment and to associated figures.

BRIEF DESCRIPTION OF FIGURES

FIG. 1 shows a schematic side view of a self-propelled work machine in the form of a dump truck in accordance with an advantageous embodiment of the invention in which the traction drive for at least one drivable wheel comprises an electric motor and a hydraulic motor which can be switched in.

FIG. 3 shows a tractive force diagram of the electric motor and of the hydraulic motor which can be switched in.

DETAILED DESCRIPTION

Figure 1:
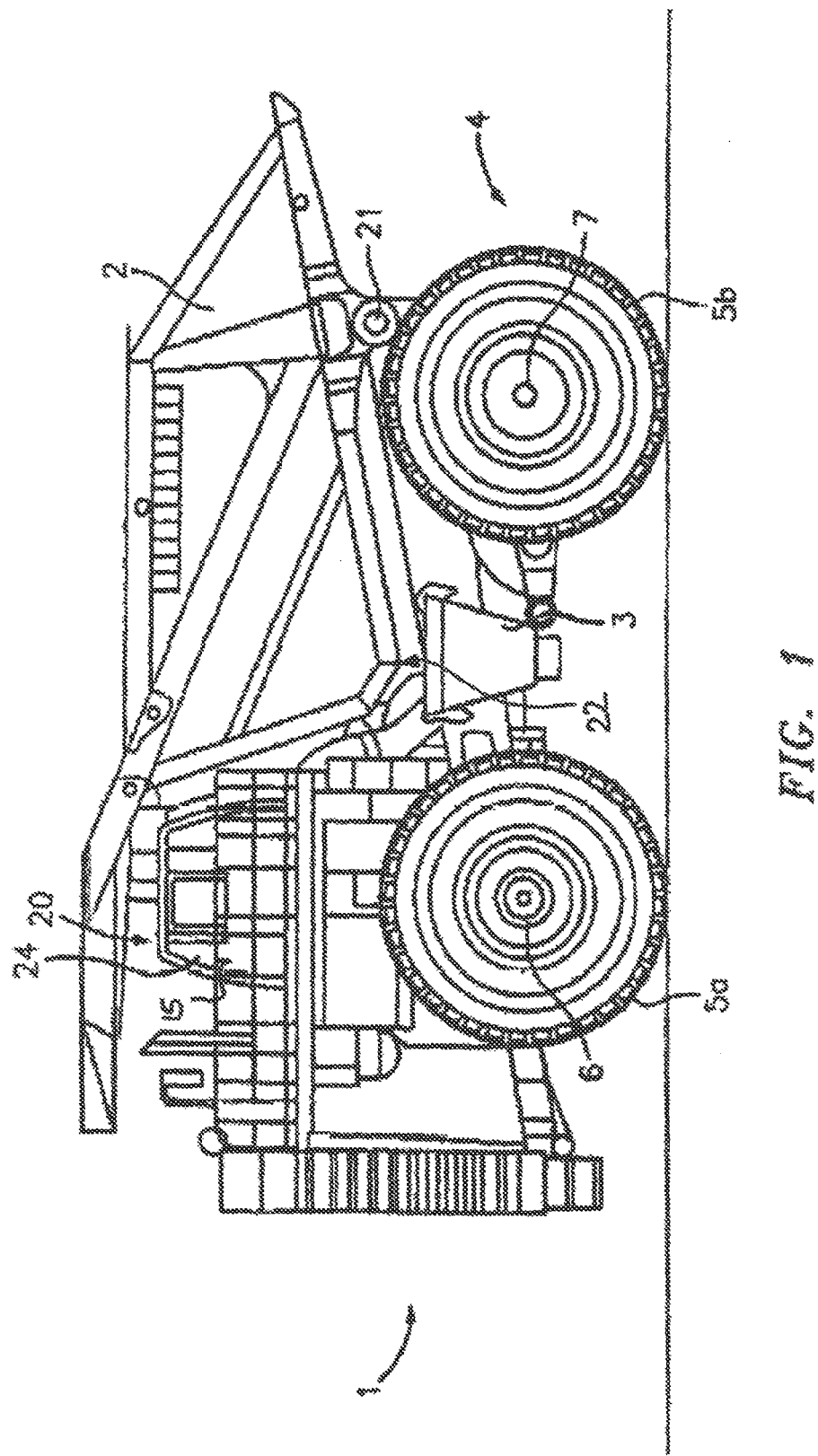

As FIG. 1 shows, the work machine can be configured, for example, as a dump truck 1 which comprises a dump body 2 supported on a chassis 3 for the transport of bulk material such as excavated material from mines, earth from construction sites, gravel or the like. The named dump body 2 can be rocked up and down or tilted about a horizontal axis 21 relative to the chassis 3 in order to be able to unload the transport material loaded in the dump body 2 by rocking up the dump body 2. The tilting mechanism 22 provided for tilting the dump body 2 can comprise an adjustment actuator not shown in more detail, for example in the form of a hydraulic cylinder which is fed from a pressure source or pump.

As FIG. 1 shows, the dump truck 1 can comprise a chassis 4 having a plurality of chassis axles at which wheels 5 are respectively supported. For example, the dump truck 1 can comprise a front axle 6 and a rear axle 7 at which wheels 5a and 5b are respectively provided.

The wheels 5 of the chassis 4 can be driven via a drive apparatus 8, with the drive apparatus 8 being able to drive only one chassis axle or also a plurality of chassis axles, in particular both the front axle 6 and the rear axle 7. In this respect, a one-wheel drive can be provided for each wheel 5 with which a single electric motor and a hydraulic motor are provided for each wheel. Alternatively, an axial drive can also be provided by means of which the wheels of one axle or also of a plurality of axles can be driven together, optionally via a differential.

Figure 2:
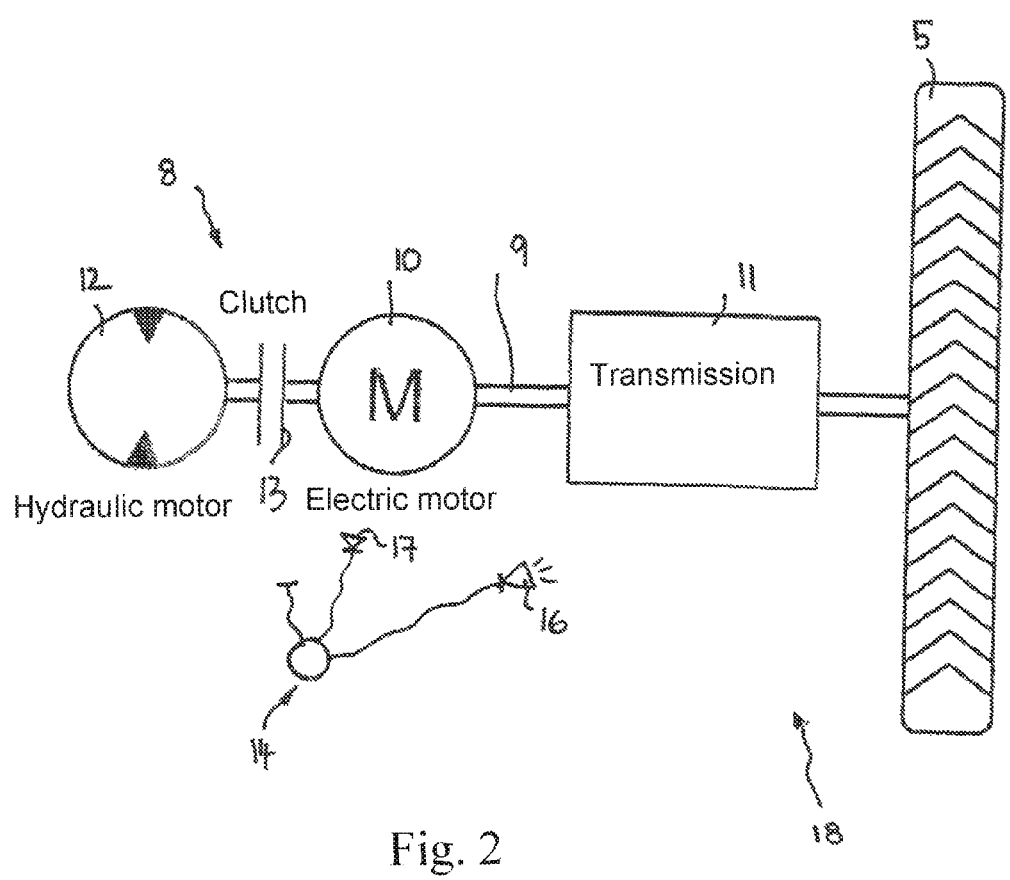
FIG. 2 shows a schematic representation of the drive train for a wheel of the dump truck of FIG. 1, wherein the connection of the hydraulic motor which can be switched in via a clutch to the electric motor of the drive train and the connection of the couplable drive motors to the wheel via a transmission are shown.

As FIG. 2 shows, the drive train 9 of the chive apparatus 8 for a wheel 5 can comprise an electric motor 10 which is connected to the named wheel 5 via a transmission 11 so that the torque of the drive of the electric motor 10 can be transmitted to the wheel 5.

The drive apparatus 8 furthermore comprises a hydraulic motor 12 which can be coupled via a clutch 13 to the named drive train 9 and can be decoupled therefrom. As FIG. 2 shows, the named hydraulic motor 12 can be directly connected to the electric motor 10 via the clutch 13 so that hydraulic motor 12 and the clutch 13 are connected in series, i.e. the torque of the hydraulic motor 12 is conducted via the electric motor 10 to the output of the drive train 9 with a closed clutch 13.

The named coupling 13 can be a dog clutch or also a multi-disk clutch, with the advantage of a dog clutch being that it works without loss in the open state, while the hydraulic motor 12 can be simply switched in with a multi-disk clutch, even with a rolling dump truck 1.

The switching in of the hydraulic motor 12 can in this respect be controlled via a control apparatus 14 which can control the coupling 13 in order to selectively close or open it, with the control apparatus 14 being able to be manually actuated or activated by means of a control or adjustment element 15 in the operator's cabin 20. Alternatively or additionally to such a manual actuation, the control apparatus 14 can, however, also comprise control means for an automatic or semiautomatic switching in or switching off of the hydraulic motor 12 and can for this purpose take account of different operating parameters of the dump truck 1, in particular the travel speed, for example in the form of the speed of the wheel 5 to be driven and/or the speed of the electric motor 10 which is detected via a suitable sensor 16 and which can be reported to the control apparatus 14. Alternatively or additionally, on the switching off or switching in of the hydraulic motor 12, the control apparatus 14 can take account of the drive torque which is required by the wheel 5, with here, for example, the power take-up or the torque of the electric motor 10 being able to be detected as an indicator via a suitable power take-up sensor 17 or by a torque sensor and being able to be reported to the control apparatus 14.

The additional drive torque of the hydraulic motor 12 is typically only required on starting and this in turn only when an extremely high starting torque is required, for example when the dump truck 1 has to start in the loaded state on an incline with poor ground. For this purpose, the hydraulic motor 12 can be coupled in via the clutch 13 on a standstill of the vehicle. This can be triggered via the named control apparatus 14, for example by the driver pressing a button in the operator's cabin 24, or it can also be done automatically by the control apparatus 14 when a travel speed still in the region of zero is detected via the sensors 16 and 17 and it is determined that the electric motor 10 reaches its maximum torque without the vehicle starting.

On reaching a predefined speed, for example a speed of approximately 5 k.p.h., the control apparatus 14 can switch off the hydraulic motor 12 again in that the clutch 13 is released since the drive torque of the electric motor 10 alone is sufficient from this point onward. The switching off or decoupling of the electric motor 10 can take place either automatically during travel or can be triggered manually by the machine operator. Provision can alternatively be made that the vehicle first has to be brought to a standstill on a better ground on which the vehicle can then start again without the support of the hydraulic motor 12. When the vehicle is stationary, the decoupling can be triggered, for example, by a manual actuation of the control element 15 in the operator's cabin 24. The control apparatus 14 can in this respect, for example, be configured such that inadmissibly high speeds of the hydraulic motor 12 are suppressed by a corresponding control of the electric motor 10 and/or of the hydraulic motor 12 as long as the hydraulic motor 12 is coupled to the drive train 9.

As FIG. 3 shows, the hydraulic motor 12 can in particular be switched in with the electric motor 10 in a range of low speed and the tractive force of the electric motor 10 can be harmoniously increased beyond its maximum torque limit. The solid line in FIG. 3 in this respect shows the tractive force curve of the electric motor 10 alone, while the dashed line shows the tractive force curve supplemented by the hydraulic motor 12, i.e. the tractive force which can be generated by switching the electric motor 10 and the hydraulic motor 12 together. As FIG. 3 shows, the switching in of the hydraulic motor 12 can take place, for example, in a speed range of the drive apparatus 8 which starts at the speed zero, i.e. on the starting, and extends over less than 25%, optionally also less than 10%, of the total possible speed range.

If the hydraulic motor 12 is required and switched in, the hydraulic motor 12 can advantageously be fed by the pump which feeds and actuates the tilting mechanism 22 of the dump body 2 since the tilting mechanism 22 is typically not required in drive operation and thus also at the starting of the dump truck 1.

In particular the following advantages can be utilized in the electric motor 10 by means of the shown mechatronic system:

The electric motor 10 can be dimensioned smaller since it can have a smaller maximum torque. The electric motor 10 hereby becomes less expensive.

Weight can be saved at the electric motor 10.

The invention claimed is:

1. A work machine having a traction drive unit and/or a main work unit which is driven via a drive apparatus comprising at least one electric motor, wherein the drive apparatus has at least one hydraulic motor supporting the electric motor, wherein the hydraulic motor is switched in and decoupled with a clutch, wherein the electric motor is arranged between the hydraulic motor and an element of the traction drive unit and/or main work unit to be driven by the drive apparatus, wherein torque of the hydraulic motor is transferred via the electric motor to the element of the traction drive unit and/or main work unit to be driven, and wherein a control apparatus is provided and includes a control device for an automatic decoupling of the hydraulic motor on an exceeding of a predefined speed and/or on a falling below of a predefined drive torque.

2. The work machine in accordance with claim 1, wherein the clutch is configured as a dog clutch or as a multi-disk clutch.

3. The work machine in accordance with claim 1, wherein the electric motor and the hydraulic motor are connected to a common drive train which is connected at an output side to an element of the traction drive unit and/or main work unit to be driven.

4. The work machine in accordance with claim 3, wherein the common drive train forms a wheel chassis drive or tracked chassis drive of the traction drive unit of the work machine.

5. The work machine in accordance with claim 3, wherein a transmission is provided between the electric motor and the element to be driven by the drive train.

6. The work machine in accordance with claim 1, wherein the hydraulic motor is arranged coaxially to the electric motor.

7. The work machine in accordance with claim 1, wherein a transmission is provided between the hydraulic motor and the electric motor.

8. The work machine in accordance with claim 1, wherein the control apparatus is provided for controlling a switching in and out of the hydraulic motor in dependence on a speed and/or on a required drive torque of the traction drive unit and/or main work unit.

9. The work machine in accordance with claim 1, wherein the electric motor has a maximum starting torque and/or a maximum drive torque which is smaller than the maximum starting torque required by the drive apparatus and/or the required maximum drive torque, wherein a sum of the maximum starting torques and/or drive torques of the electric motor and of the switched in hydraulic motor is at least as large as the required maximum starting torque and/or drive torque of the drive apparatus.

10. The work machine in accordance with claim 1, wherein the work machine is configured as a dump truck and the drive apparatus is configured as a wheel drive for driving at least one wheel of a chassis of the dump truck.

11. The work machine in accordance with claim 10, wherein the hydraulic motor is supplied by a pump of a tilting mechanism for tilting up a dump body of the dump truck.

12. The work machine in accordance with claim 1, wherein the main work unit is configured as a hoisting drum drive, wherein the work machine is configured as a crane or of a piece of lifting gear and a hoisting drum is provided for adjusting a hoist rope or a guying rope.

13. The work machine in accordance with claim 1, wherein the work machine is a truck.

* * * * *